(12) United States Patent
Holub et al.

(10) Patent No.: US 9,740,181 B2
(45) Date of Patent: Aug. 22, 2017

(54) IDENTIFYING MODELS OF DYNAMIC SYSTEMS USING REGRESSION MODEL FOR PARAMETERS AND ERROR RATES

(71) Applicant: Honeywell International Inc., Morristown, NJ (US)

(72) Inventors: Ondrej Holub, Prague (CZ); Karel Macek, Prague (CZ); Karel Marik, Revnice (CZ)

(73) Assignee: Honeywell International Inc., Morris Plains, NJ (US)

( * ) Notice: Subject to any disclaimer, the term of this patent is extended or adjusted under 35 U.S.C. 154(b) by 601 days.

(21) Appl. No.: 13/672,178

(22) Filed: Nov. 8, 2012

(65) Prior Publication Data

US 2014/0128997 A1    May 8, 2014

(51) Int. Cl.
G05B 13/04    (2006.01)

(52) U.S. Cl.
CPC .... *G05B 13/048* (2013.01); *G05B 2219/2614* (2013.01)

(58) Field of Classification Search
None
See application file for complete search history.

(56) References Cited

PUBLICATIONS

Glenn Platt et al., "Adaptive HVAC zone modeling for sustainable buildings", Apr. 2010, Energy and Buildings, Elsevier, vol. 42, Issue 4, pp. 412-421.*
Michael Wetter et al., "A comparison of deterministic and probablistic optimization algorithms for nonsmooth simulation-based optimization", Aug. 2004, Building and Environment, Elsevier, vol. 39, Issue 8, pp. 989-999.*
A. J. Booker et al., "A rigorous framework for optimization of expensive functions by surrogates", Feb. 1999, Structural and Multidisciplinary Optimization, Springer-Verlag, vol. 17, Issue 1, pp. 1-13.*
Cheol Park et al., "An Overview of HVACSIM+, A Dynamic Building/HVAC/Control Systems Simulation Program", 1985, ibpsa.org, pp. 175-185.*
Michael Wetter et al., "Modelica Versus TRNSYS—A Comparison Between an Equation-Based and a Procedural Modeling Language for Building Energy Simulation", Aug. 2-4, 2006, ibpsa.us, Second National IBPSA-USA Conference, pp. 262-269.*
Min Xu et al., "Practical generalized predictive control with decentralized identification approach to HVAC systems", Jun. 21, 2006, Energy Conversion and Management 48, Elsevier, pp. 292-299.*
Karel Macek, et al. "Tuning Model Structures of Dynamic Systems", Filed Aug. 30, 2012, U.S. Appl. No. 13/599,712 (36 pgs).

* cited by examiner

*Primary Examiner* — Mohammad Ali
*Assistant Examiner* — Saad M Kabir
(74) *Attorney, Agent, or Firm* — Brooks, Cameron & Heubsch, PLLC (57) ABSTRACT

Identifying models of dynamic systems is described herein. One method for identifying a model of a dynamic system includes estimating a number of parameters for each of a number of models of the dynamic system, predicting an output using the estimated number of parameters for each of the number of models, calculating a rate of error of the predicted output for each of the number of models compared to an observed output, and identifying a best model among the number of models of the dynamic system based on the calculated rate of errors.

18 Claims, 6 Drawing Sheets

IDENTIFYING MODELS OF DYNAMIC SYSTEMS USING REGRESSION MODEL FOR PARAMETERS AND ERROR RATES

TECHNICAL FIELD

The present disclosure relates to methods, computer-readable medium, and systems for identifying models of dynamic systems.

BACKGROUND

Models of a dynamic system can refer to statistical modeling of a dynamic system using measured data (e.g., data associated with the components, equipment, and/or properties of a dynamic system). For example, a dynamic system can include a heating, ventilation, and air-conditioning (HVAC) system, a building and/or a manufacturing system.

DETAILED DESCRIPTION

Embodiments of the present disclosure include identifying a model of a dynamic system. Identifying a model of a dynamic system can include remotely monitoring the dynamic system to identify a model for each zone of the dynamic system.

A model, as used herein, can include predictive modeling of variables of a dynamic system based on observed past values of the variables. A model can be formed using parameter estimation applied to a model structure and the observed past values of the variables (e.g., measured data).

Models of a dynamic system can be used for model predictive control (MPC). MPC can include a system supervisory control, such as, that can deal with architectures, mechanisms, and functions (e.g., algorithms) for maintaining the output of a specific process with a desired range. For instance, MPC can include control of individual controllers and/or control loops by a human and/or automatic control system. MPC can depend on a model of the dynamic system, wherein the model can represent a behavior of the dynamic system.

For example, a dynamic system, such as a HVAC system, can include a system with a number of controlled machines (e.g., equipment) and/or processes that continue autonomously. A human can, from time to time, observe the dynamic system and determine that a control algorithm needs to be modified in some way. Modifying the control algorithm can include making changes to a model of the dynamic system.

Accurately identifying a model of a dynamic system can, for example, result in lower cost of running the dynamic system compared to inaccurate set up. Optimizing a setting of the parameters of a model can depend on a structure of a building, equipment, and/or properties associated with the dynamic system, as well as the quality of available data.

In some instances, variables of a dynamic system, such as a HVAC system, can be difficult to model because of inadequate documentation and human behavior. Example variables of a dynamic system can include inputs into the dynamic system, outputs of the dynamic system, energy consumption of the dynamic system, and states of the dynamic system, among many other variables. As an example, data of a dynamic system may include missing measurements and/or faulty measurements.

For instance, MPC of a HVAC system can depend on a number of parameters of a model. The number of model parameters can include discrete parameters (e.g., a model structure) and continuous parameters (e.g., locality of data, robust regression parameters, and regularized regression parameters). In addition, the number of parameters of a model, in some complex and/or multi-zone systems, can be numerous. A zone, as used herein, can include a sub-portion of a dynamic system.

Further, the number of parameters of a model can include one or more hidden disturbances. A hidden disturbance can include a parameter that is not and/or cannot be directly measured. For example, a hidden disturbance can include internal heat gains and/or internal mass temperature of at least a part of the dynamic system. Existence of hidden disturbances can cause difficulty in accurately identifying and estimating model parameters and/or a model of a dynamic system.

Manual installation and/or intervention of setup variables and/or parameters, including identifying a number of parameters of a model of the dynamic system, may be used for MPC. However, manual installation of setup variables and/or parameters can affect deployment cost and/or can impact overall profits.

In contrast, identifying models of dynamic systems in accordance with one or more embodiments of the present disclosure may include identifying a best model among a population of candidate models by remotely monitoring a dynamic system (e.g., monitoring data using the Internet). For instance, identifying a model of a dynamic system can include identifying a best zone model for each zone of a dynamic system and identifying a model for the dynamic system based on each of the best zone models. A zone model can include a sub-model of the dynamic system. A best zone model can, for example, include a model among the population with a lowest rate of error.

Identifying a model of a dynamic system based on a best model of each zone of the dynamic system can reduce a cost and/or a time needed to determine the model and/or for MPC as compared to identifying a model of the dynamic system individually.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar dig its.

As used herein, "a" or "a number of" something can refer to one or more such things. For example, "a number of objects" can refer to one or more objects. Additionally, the designator "N", "P", "Q", and "R", as used herein, particularly with respect to reference numerals in the drawings, indicate that a number of the particular feature so designated can be included with a number of embodiments of the present disclosure.

Figure 1:
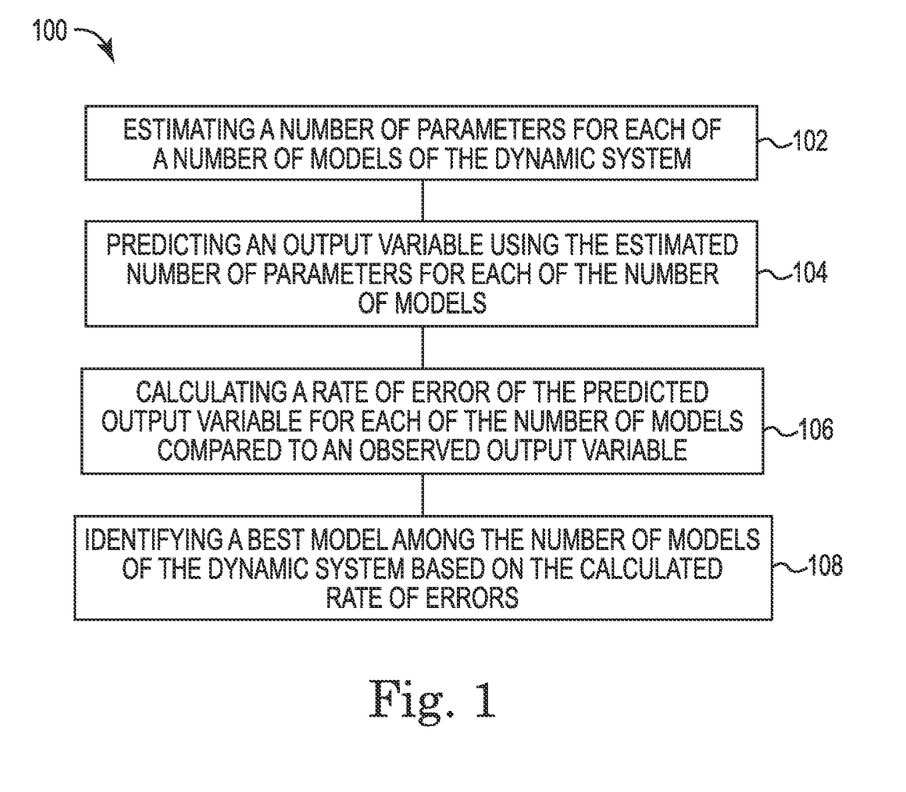
FIG. 1 illustrates a method for identifying a best model of a dynamic system in accordance with one or more embodiments of the present disclosure.

FIG. 1 illustrates a method 100 for identifying a best model of a dynamic system in accordance with one or more embodiments of the present disclosure. A dynamic system can include a HVAC system, a building system, and/or a manufacturing system, among other suitable dynamic systems that would benefit from identifying a model of the dynamic system.

A model, as used herein, can include a number of model parameters estimated (e.g., regression coefficients estimated) and associated with a number of input variables. A model can be identified by identifying a number of model parameters in data. Model parameters can include discrete parameters (e.g., a model structure) and continuous parameters (e.g., locality of data, robust regression parameters, and regularized regression parameters).

For instance, a model can result in a prediction of one or more variables of a dynamic system (e.g., values of output variables with a linear dependency) based on estimated model parameters (e.g., regression coefficients) associated with particular input variables and recently measured data. A model can be used, for example, for MPC of a dynamic system.

MPC, as used herein, can include control of individual controllers and/or control bops by an automatic control system. For example, a dynamic system, such as a HVAC system, can have a number of controlled machines (e.g., equipment) and/or processes that continue autonomously. MPC can control a dynamic system using a control algorithm, for instance. A control algorithm can be determined and/or optimized using a model of the dynamic system.

Dynamic systems, such a HVAC system, can include a closed loop control system. A closed loop control system can, for instance, be a system with an output that can have a direct affect on a control action. In such instances, a control action can include an output variable, such as internal air temperature of the dynamic system. The difference between the input and the output can be fed to a controller (e.g., a model predictive controller) to reduce the error and bring the output variable of the system to a predetermined and/or threshold value. For example, in an HVAC system, a controller can measure the internal air temperature and automatically make adjustments in the system to cause the predetermined and/or threshold internal air temperature.

At block 102, the method 100 for identifying a model of a dynamic system can include estimating a number of parameters for each of a number of models of a dynamic system. The number of models can include a number of sub-models of the dynamic system and/or a number of models of the complete dynamic system (e.g., dynamic system models), for example. Estimating a parameter can, for instance, include calculating a value for the parameter based on a model of the dynamic system. The number of parameters for each model can be estimated at the same time.

The number of parameters of a model can include dynamic model of the system parameters, hidden disturbances, linear correction parameters, and initial values of hidden states, among other parameters. Dynamic model of the system parameters can include one or more parameters related to how a next state (e.g., value of a parameter and/or variable in the next period of time and/or next time instance) is influenced by one or more actual states, one or more controlled inputs, and/or one or more disturbances.

An actual state can include an observable value of a parameter and/or variable in a current period of time, for instance. Example actual states can include zone air temperatures and/or supply air temperatures, among other observable parameters and/or variables. The one or more actual states can be denoted by $x_o \in \Re^{N_o}$ and can correspond to measurements $y \in \Re^{N_o}$, wherein N can denote the size of the data set. In accordance with one or more embodiments of the present disclosure, the observed value of a parameter and/or variable may not be equal to the predicted value due to limitation of measurements (e.g., noise, drift, and/or rounding to integers).

A controlled input can include a variable that can be set up by the model predictive controller and/or input into the dynamic system. The one or more controlled inputs can be denoted by $u \in \Re^{N_u}$. A model predictive controller can include a controller that automatically regulates the dynamic system to control the output variable and/or control action (e.g., internal air temperature). An example controlled input can include the on-time of a cooling stage during a time instant in an HVAC system and/or building system.

A disturbance can, for example, include a parameter that adversely affects the value of the output variable and/or control action of the dynamic system. A disturbance can be internally generated by the dynamic system (e.g., mass of equipment of the system) and/or include an input that is generated outside the dynamic system (e.g., internal heat gain derived from daily occupancy patterns). Disturbances can be measurable and/or hidden. A measured disturbance can be denoted by $d \in \Re^{N_d}$ and can include ambient temperature.

Hidden disturbances can be denoted by $q \in \Re^{N_q}$. Example hidden disturbances can include internal heat gains and/or human occupancy of a building and/or zone, among many other disturbances. Internal heat gains can include temperature increases of the dynamic system that depend on the time of day. For example, the internal heat gain parameters can include probable profiles of internal temperature increases (e.g., temperature increases inside the dynamic system).

Linear correction parameters can include how a state can be corrected with respect to a recent gap between one or more predicted values and observed values. As an example, a predicted value of an internal air temperature may be 10 degrees Celsius (C) warmer than an observed internal air temperature. The linear correction parameters can include identification of parameters that can be adjusted to correct the gap, for instance.

Initial values of hidden states can include probable values of hidden states at a first time instance. Hidden states can include parameters that cannot be directly measured. For instance, hidden states can include temperatures of walls and/or floors, among other states.

In some embodiments of the present disclosure, each of the number of models can include a sub-model of the dynamic system. A sub-model of the dynamic system can include a model of a zone of the dynamic system, for instance. A zone of the dynamic system, as used herein, can include a sub-portion of the dynamic system. For example, a first zone of a building with a HVAC system can include a sub-portion of the building with a separate thermostat than a second zone of the building. Such zones can, for instance, be referred to as a thermal zone.

Different zones of a building with an HVAC system can have different gains and losses at a particular time. As an example, a building may include an office skyscraper that has zones facing the north, east, south, and west. A zone that is facing east, for example, during the morning may receive a greater amount of solar gain from sun exposure than the remaining zones. Heat gains may be greater, as a result, for the east facing zones, and may require cooling while the rest of the building may require heating. In addition, interior zones and/or portions of a zone with no exterior walls, roofs, and/or flows may only have internal gains from people, lighting, and/or equipment.

At block 104, the method 100 for identifying a model of a dynamic system can include predicting an output variable using the estimated number of parameters for each of the number of models. An output variable can be predicted for each of the number of models. For instance, the output variable can be predicted and/or calculated for each model using the estimated number of parameters of each model and known inputs.

In accordance with some embodiments of the present disclosure, the one or more output variables can be predicted for a number of time instances in a period of time. For instance, time instances can include a number of observations in a period of time and/or a number of predictions throughout the period of time. A period of time, as used herein, can include an amount of time for observation and/or evaluation of the models. As an example, in a period of time of twenty-four hours, a prediction can be made every time instance of an hour for a total of twenty-four predictions.

In various embodiments of the present disclosure, the method 100 can include predicting an initial value for the one or more parameters and/or variables. Predicting an initial value for the parameters and/or variables can include setting an initial value for each parameter and/or variable, for instance.

At block 106, the method 100 for identifying a model of a dynamic system can include calculating a rate of error of the predicted output variable for each of the number of models compared to an observed output variable. A rate of error of the predicted output variable can be calculated by comparing the predicted value and the observed value of the output variable. For instance, comparing a predicted value to an observed value of an output variable can include calculating a difference between the predicted value and the observed value.

In accordance with one or more embodiments of the present disclosure, a predicted value for an output variable can include a prediction of a value for an output variable based upon a number of known variables and/or inputs. The value can be predicted for a period of time (e.g., one hour, twenty-four hours, and a week), for example. An observed value, as used herein, can include a measured value of the output variable and/or a true value in a period of time and/or time instance.

The rate of error of the one or more predicted output variables for a model can include a rate of error of the model, for example. The rate of error for a model can, for instance, be used to define a quality of the model. As an example, a first model with a lower rate of error than a second model can include a better quality model than the second model.

In some embodiments of the present disclosure, a rate of error of a model can include an aggregate rate of error. A rate of error for a model and/or a number of models can be updated and/or aggregated over time based on a number of evaluations of the model and/or number of models, for instance.

At block 108, the method 100 for identifying a model of a dynamic system can include identifying a best model among the number of models of the dynamic system based on the calculated rate of errors. A best model can include a model with a lowest calculated rate of error among the number of models. The best model can, for instance, be saved and/or used for MPC.

Figure 2:
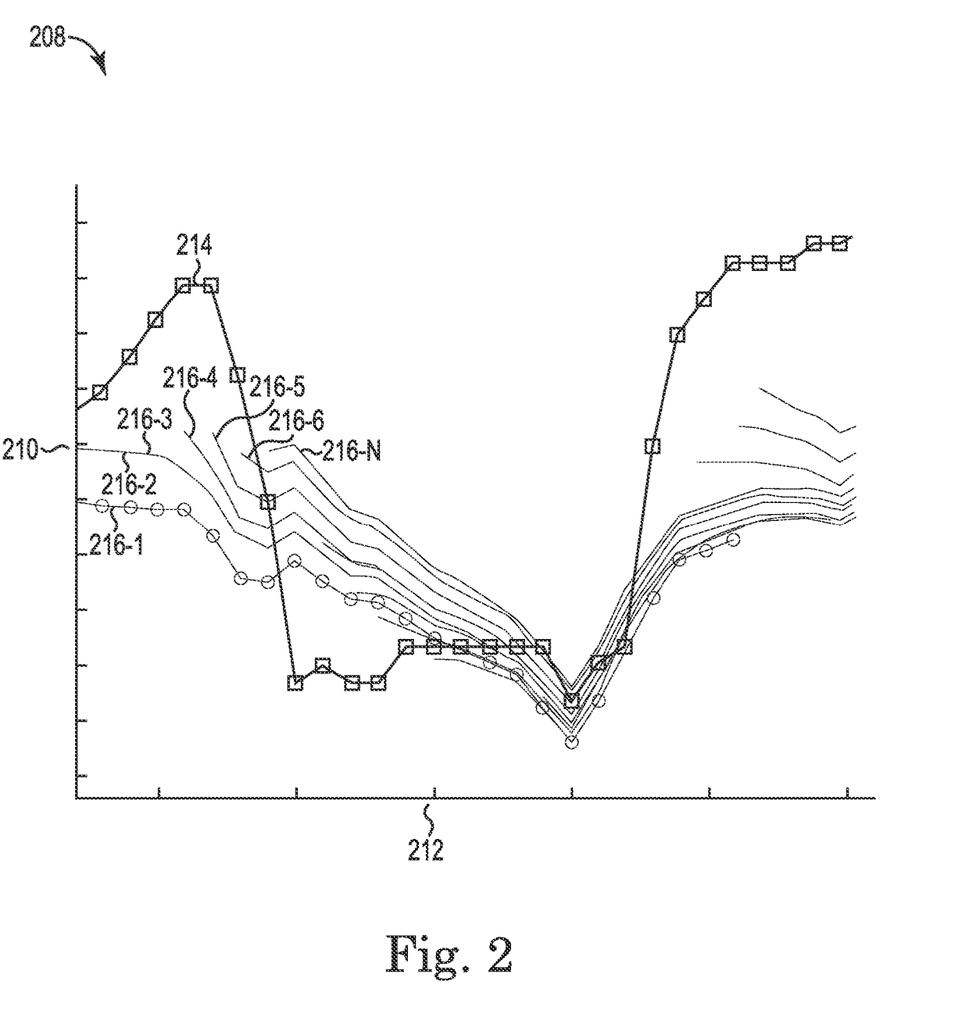
FIG. 2 illustrates a graph of an evaluation of a model of a dynamic system in accordance with one or more embodiments of the present disclosure.

FIG. 2 illustrates a graph 208 of an evaluation of a model 216-1, 216-2, 216-3, 216-4, 216-5, 216-6 . . . 216-N of a dynamic system in accordance with one or more embodiments of the present disclosure. The graph 208 of the evaluation of the model, as illustrated in the embodiment of FIG. 2, can include an evaluation of one parameter and/or the output variable of the model of the dynamic system. However, embodiments of the present disclosure are not so limited. Models can, for instance, include multiple parameters and/or output variables.

The graph 208 can include a number of values 210 predicted for an output variable (e.g., as shown by the model 216-1, . . . , 216-N) over a number of time instances in a period of time 212 as compared to observed values 214 over the period of time 212. The observed values 214 of the output variable can include a number of observations of the output variable over a number of time instances in the period of time 212 for a model of the dynamic system. The predicted values for the output variable based on the model 216-1, . . . , 216-N can be compared to the observed values 214, for example.

In some embodiments of the present disclosure, as illustrated by graph 208 of FIG. 2, predicting a value of the output variable of the model over a number of time instances in a period of time can include a one-step prediction correction. A one-step prediction correction can include a filtration process, such as Kalman filter, extended Kalman filter and/or particle filter. Parameters and/or variables to be corrected using a one-step prediction correction can be denoted as $\theta_k$. For instance, all parameters and/or variables of a model can be denoted as $\theta=(\theta_p,\theta_g,\theta_x,\theta_q,\theta_k)$.

A one-step prediction correction can include correcting a prediction of a parameter and/or the output variable for a following time instance based on an observed value of the parameter and/or output variable in a current time instance. As an example, a one-step prediction correction can include predicting a first value of the output variable at a first time instance and predicting a second value of the output variable for a second time instance based on an observed value of the output variable and/or a parameter for the first time instance.

In some embodiments of the present disclosure, a one-step prediction correction can be applied to a day-ahead forecast of each model.

A one-step prediction correction can, for instance, include setting and/or correcting a value for a parameter and/or the output variable. Based on an observed value for the parameter and/or output variable at the beginning time instance (e.g., first time instance), a prediction of the output variable for the second time instance can be corrected using the observed value at the beginning time instance (e.g., resulting in 216-2). In addition, an observed value for the second time instance can be used to correct a prediction of the output variable at a third time instance (e.g., resulting in 216-3). A value for the parameter and/or output variable based on the model can be calculated for each one-step prediction for the remaining time instances in the period of time.

A model can have a number of predictions. For instance, using a one-step prediction correction, each prediction can start at a time instance and can be corrected based on an observation for that time instance, resulting in a number of predictions for a single model (e.g., as illustrated by 216-1, . . . , 216-N). Further, an output variable value can be predicted for each one-step prediction until the period of time for evaluation of the model is complete (e.g., until the period of time is reached). For example, a one-step prediction correction that begins at the second to last time instance may have two output variable values (e.g., one observed value at the second to last time instance and one predicted value at the last time instance).

Figure 3:
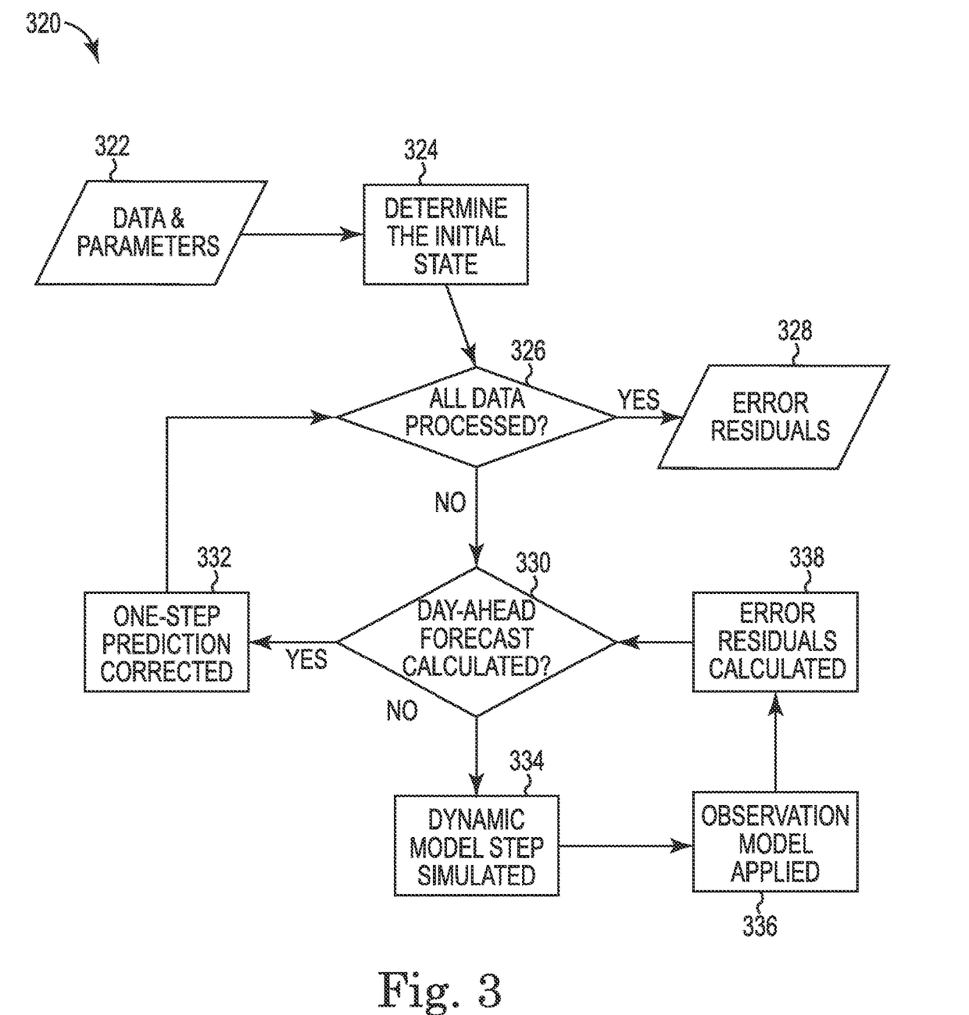
FIG. 3 illustrates a block diagram for evaluating a number of models of a sub-portion of a dynamic system in accordance with one or more embodiments of the present disclosure.

FIG. 3 illustrates a block diagram 320 for evaluating a number of models of a sub-portion of a dynamic system in accordance with one or more embodiments of the present disclosure. A sub-portion of a dynamic system, as used herein, can include a zone of the dynamic system. Evaluating a number of models of a sub-portion of a dynamic system can include execution simulation of the models. Evaluating a number of models of a zone can, for instance, be used to identify a best model for a zone and/or propose a revised model for the zone.

Evaluating a model can include entering data and parameters for the model, at block 322. Parameters can include the parameters of the model for the zone of the dynamic system, for instance. The parameters and/or parameter values may be different, in some embodiments of the present disclosure, between each model of the one or more zones.

Entering the data and parameters can, for example, include entering the data and parameters in a matrix and/or a graph. For instance, a matrix can include a data table. A graph can, for example, include an oriented graph and/or a drag-and-drop graphical user interface.

Once parameters and/or data of a model are entered, at block 324, an initial state for each parameter can be determined. An initial state can include an initial value of a parameter of the model for a beginning time instance. Initial states can, for example, be partially from readings and/or partially from identification of parameters. For instance, a parameter can include one or more initial values of one or more hidden states. The initial state of a hidden state can be determined based on the identification of the parameter, for example. In some embodiments of the present disclosure, an initial state can be based on partial readings of the parameter.

At block 326, a determination can be made as to whether all data has been processed. All data may be processed, for instance, if a day-ahead forecast with one-step prediction correction had been performed for the one or more time instances in the period of time.

In response to determining that all data has not been processed, a determination can be made as to whether day-ahead forecast has been calculated, at block 330. Day ahead forecast can include a prediction of the output variable of the model (e.g., with no one-step prediction correction), for example.

In response to determining that day-ahead forecast has not been calculated for the model, at block 334, a dynamic model can be simulated. A dynamic model can include a state evolution model that describes how the states depend on their previous values and inputs. The dynamic model and/or state evolution model can be denoted by:

$$x(t+1)=f(x(t),u(t),d(t),q(t),\theta_f) \quad (1).$$

Wherein x can denote observable states of the dynamic system (e.g., internal air temperature of the zone and/or the dynamic system, and/or supply air temperatures), u can denote controlled inputs, d can denote measured disturbances, and q can denote hidden disturbances. The vector $\theta_f$ can denote related parameters of the dynamic model and/or state evolution model. Simulating the dynamic model can be used to identify one or more dynamic model parameters (e.g., $\theta_f$).

In one or more embodiments of the present disclosure, one or more initial state parameters can be used to simulate the dynamic model. The one or more initial state parameters can be denoted as $x(0)=\theta_x$ Hidden disturbances q can, for instance, include systematic unobserved disturbances. For example, a hidden disturbance can include human occupancy of a zone and/or dynamic system. Hidden disturbances q can be considered as a function of time and several parameters denoted by $q(t,\theta_d)$.

In some embodiments, weather forecast can be a parameter of a dynamic system model. For instance, outside temperature can affect the internal temperature of a building zone and/or can be relevant to modeling of a dynamic system (e.g., HVAC system). The weather forecast can be localized, for instance, by combining a third-party forecast with local history. The localization may be denoted as a procedure by a parameter $\theta_w$.

In response to the simulation of the dynamic model, at block 336, an observation model can be applied. An observation model can, for instance, describe how the one or more outputs depend on the actual states. The observation model can be denoted by:

$$y(t)=g(x(t),\theta_g). \quad (2)$$

Wherein the vector $\theta_g$ can denote related parameters of the observation model (e.g., observation model parameters). The observation model can be used to predict values x(t) for one or more parameters and/or one or more variables using the model for the one or more time instances in the period of time (e.g., day-ahead prediction).

In response to applying an observation model, at block 338, error residuals of the model can be calculated for a day-ahead forecast. Error residuals can, for example, include differences between observed values and predicted values of the one or more output variables of a model.

In response to determining a day-ahead forecast has been calculated, at block 332, one-step prediction can be corrected for the day-ahead forecast based on observed values of the system (e.g., the filtration process as described in FIG. 2). The observed values can include values for the one or more parameters and/or the one or more output variables of the model, for instance. The parameter and/or variable values can be observed, for instance, at a number of time instances. The one-step prediction correction can update the knowledge about the dynamic system states (e.g., actual states) using observed parameter and/or variable values y(t) to reconstruct the predicted parameter and/or variable values x(t) for a future time instance.

At 326, a determination can be made whether the data is processed. In response to determining the data has been processed, error residuals of the one-step prediction correction can be calculated and/or stored for the model, at 328. Error residuals can include errors of each of the one-step prediction corrections of each model compared to an observed value. As an example, an error residual of a single one-step prediction correction can include the difference of a predicted value of an output variable at one-step of the model for 12:00 P.M. and an observed value of the output variable at 12:00 P.M. A prediction error can include an average sum rate of error of the error residuals (e.g., calculated rate of error).

The error residuals and/or prediction error of a model can be minimized for a given prediction horizon $t_{max}$ (e.g., one day, 96 hours, etc.) corresponding to a number of time instances (e.g., a number of samplings such as 1 hour and 15 minutes). For example, $\hat{x}(t,r)$ can denote an estimate of $x(t+\tau)$ at time t, while $\tau=1, \ldots, t_{max}$. Further, $\hat{x}(t)=\hat{x}(t,0)$ can be introduced for the estimate of x(t) at t. Filtration may be applicable, in some embodiments of the present disclosure, for $\tau=0$, The prediction error can be expressed in various functions denoted as p: $\Re \to \Re$. Example prediction errors can include mean square error $\rho_{muse}(\xi)=\xi^2$ and/or mean absolute error $\rho_{muse}(\xi)=|\xi|$. For instance, pseudo-code for calculating an overall prediction error for a model of an HVAC system can include:

```
function ERROR (N_t,θ)
    e = 0
    x(0) = θ_x
    for t=1,....,N_t - t_max do
        Prediction and filtration of x̂(t) using θ_f, θ_g, andθ_k
        for τ = 1,....t_max do
            q̂(t,τ - 1) ← q(t + τ - 1,θ_q)
            d(t,τ - 1)is calculated using θ_w
            x̂(t,τ) ← f(x̂(t,τ - 1),u(t + τ - 1),d̂(t,τ - 1),q̂(t,τ - 1)
            e ← e + γ^(τ-1) Σ_{i-1}^{N_y} ρ(y_i(t) - g_i(x̂(t,τ,θ_g)))
        end for
    end for
end function.
```

Wherein $\gamma \in |0,1|$ can include a discounting factor driving the importance of further forecast.

Figure 4:
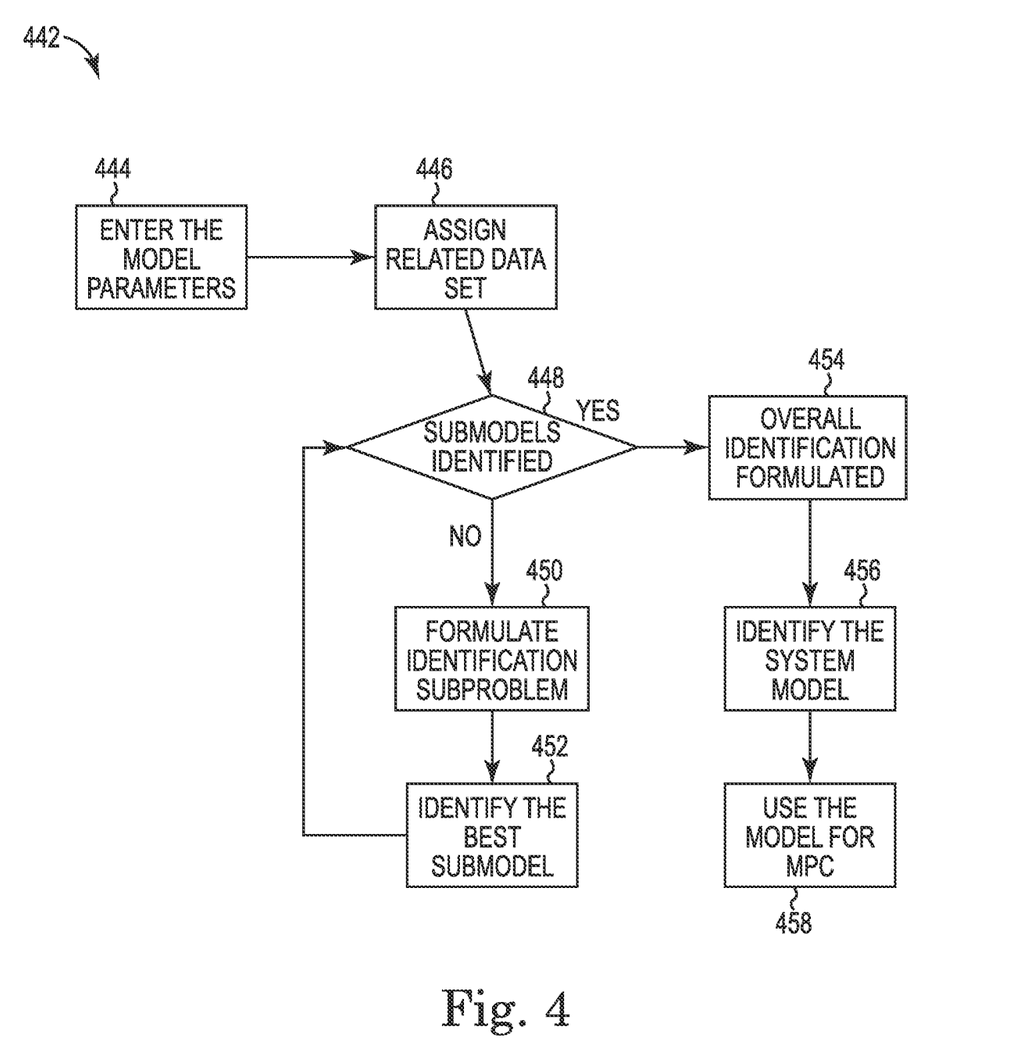
FIG. 4 illustrates a block diagram for identifying a best model of a dynamic system in accordance with one or more embodiments of the present disclosure.

For instance, having data of length $N_t$, an identification problem (e.g., identification sub-problem as further discussed in FIG. 4) can be formulated as:

$$\theta^* = \underset{\theta \in \Theta}{\operatorname{argmin}} e(N_t, \theta). \quad (3)$$

Wherein $\Theta \subset \Re^{N_\theta}$ can include a set of all admissible parameters. For instance, some of the admissible parameters can be positive due to their physical interpretation.

In accordance with some embodiments of the present disclosure, the error residuals calculated can be aggregated. For instance, more than one evaluation of a model can be performed. The error residuals of more than one evaluation can be aggregated, recorded and/or stored, for example. For instance, the error residuals of each model can include an aggregate total of the error residuals for an output variable of the model and a number of one-step correction predictions.

In some embodiments of the present disclosure, a zone (e.g., sub-portion of a dynamic system) and/or dynamic system can have a population of candidate models. The population of candidate models can include one or more models that are candidates for being a best model of the zone and/or dynamic system. The population of candidate models and/or the respective aggregate error rates can be stored and/or recorded.

For instance, an aggregate rate of error can include an aggregation of residual errors for each evaluation of a model. An aggregate rate of error can, for example, include an average sum error of a model including the output variable of the model over a number of evaluations performed. The aggregate rate of error for a model can, for instance, be updated over time based on a number of evaluations of the model.

In various embodiments of the present disclosure, a best model can be saved. For instance, a best model among the number of models can be identified and/or determined based on the calculated rate of error. A best model can include a model with a lowest calculated rate of error among the number of models. The saved best model can, for example, be used for MPC.

In some embodiments of the present disclosure, a number of well performing models can be saved. The number of well performing models can include a population of models saved (e.g., candidate models). A well performing model can include a model with a lower calculated rate of error than the remaining number of models.

For instance, the number of well performing models can include a threshold number of models. A threshold can include a numerical number of well performing models (e.g., ten, a hundred, a thousand). For example, the number of well performing models can include the best model of a zone of the dynamic system and/or best model of the dynamic system.

FIG. 4 illustrates a block diagram 442 for identifying a best model of a dynamic system in accordance with one or more embodiments of the present disclosure. For example, a dynamic system can include a system with one or more zones.

At block 444, a number of model parameters of the dynamic system can be entered. Model parameters of the dynamic system can include number of time instances, influences of the dynamic systems, internal gains, types of parameters, used data sources and/or related data, and relevance of the records, among other parameters. The model parameters of the dynamic system can be entered, for instance, in a table, a matrix, and/or an oriented graph (e.g., graphical user interface).

For example, number of time instances can include a number of times the parameters for a model will be measured in a period of time (e.g., samples per twenty-four hours and/or time instances per period of time). Influences of a dynamic system can include the topology of a system and/or other impacts to the dynamic system. Internal gains can include an identification of the existence of internal gains.

Types of parameters can include the names and/or identification the parameters. For example, types of parameters can include outside air temperature, temperature of walls/structure, internal air temperature in a zone and/or in the dynamic system, internal mass (e.g., people, equipment), internal gains (e.g., from humans), and internal inputs (e.g., cooling, heat, and venting), among other types of parameters. Used data source and related data can include a related data set of simulated and/or observed variables. Relevance of the record can include the relevance of the used data source. The relevance of the record can, for instance, be provided and/or predetermined.

At block 446, the related data set can be assigned. For instance, assigning a related data set can include identifying a current and/or future data set.

A determination can be made, at block 448, whether all sub-models for the dynamic system are identified. A sub-model for a dynamic system can include a model of a sub-portion and/or zone of the dynamic system, for instance.

In response to determining that all sub-models are not identified, at block 450, identification sub-problem can be formulated. For instance, formulating an identification sub-problem can include identifying a number of parameters for each sub-model of the dynamic system, proposing new and/or revised sub-models for the zone (e.g., sub-portion of the dynamic system), execution simulation of a population of sub-models for the zone (e.g., as described further in FIG. 3), and calculating a rate of error for each sub-model in the population.

At block 452, a best sub-model for the zone (e.g., zone model) can be identified based on the calculated rate of error for each sub-model of the zone of the dynamic system. The best sub-model can, for instance, include a sub-model in the population with the lowest calculated rate of error.

Identifying a best sub-model for the zone can include solving the identification sub-problem formulated (e.g., Equation 3). For example, the identification sub-problem formulated can be solved using off-line identification, identification using initial segments, and/or on-line identification.

Off-line identification can include an offline solution to solve the identification problem and/or sub-problem by directly trying each candidate Θ. For each candidate, the whole error function can be calculated. The off-line identification approach can assist in preliminary understanding of the input space using shorter history and/or can use complete simulations for making parameters precise. Processing of the entire data set can, for instance, be time consuming.

Further, identification sub-problem can be solved by identifying initial segments. For instance, an error can be calculated for $e(h_n, \theta^{(n)})$ for n=1, 2, ... and $0 \leq h_1 \leq h_2 ... \leq N_t$. In order to make an earlier trial comparable with the current one, the errors can be extended. Extending errors can include calculating $e(n_h, \theta^{(j)})$ for j<h. Identifying initial segments can include a faster approach than off-line identification due to a rough orientation at the beginning of the process.

On-line identification can include solving the identification at each observation (e.g., each time instance). For example, when a new observation y(t) is obtained, a gradient is calculated and the $\hat{\theta}$ is updated. At each time instance, $t_{max}$ items are evaluated which can be denoted by:

$$e_{now}(t, \theta) = \sum_{\tau=1}^{t_{max}} \sum_{i=1}^{N_y} \rho(y(t) - g(\hat{x}(t-\tau), \tau), \theta_g)). \quad (4)$$

In response to determining that all sub-models are identified (e.g., block 448 as discussed above), at block 454, overall identification can be formulated. Overall identification can include identifying a model of the dynamic system.

The model of the dynamic system can include a combination of each best sub-model of the dynamic system (e.g., best model of each zone) identified and the parameters of each sub-model. The combination of the best sub-models can, for example, be used as a population for optimization and/or as a starting point for gradient based optimization.

In some embodiments of the present disclosure, each sub-model can have interactions between parameters and/or variables between sub-models and/or zones of the dynamic system. For instance, the temperature of a zone A can interact with the temperature of a zone B. The interaction of parameters between sub-models and/or zones can, for instance, be initiated to zero.

At block 456, the best model of the dynamic system can be identified. Identifying the best model can include proposing a model of the dynamic system (e.g., model of the complete dynamic system). The model of the dynamic system can include the parameters of the best model for each zone of the dynamic system and interaction parameters. Interaction parameters, as used herein, can include interactions of parameters between zones of the dynamic system. The proposed model and/or a population of candidate models can be evaluated and/or simulated, for example.

Evaluation and/or simulation of the model and/or population of candidate models can include determining initial states of each parameter of the model and/or population. The initial state of each parameter can include identified values of parameters based on the best model of a zone of the dynamic system (e.g., hidden states, temperature of a zone, and internal inputs) and/or an initial value of interaction parameters (e.g., a prediction).

The initial states can be used to predict a day-ahead and/or other period of time forecast. A day-ahead and/or other period of time forecast can include a prediction of one or more output variables of a model in the day and/or period of time. For example, a day-ahead and/or other period of time forecast can include simulating the dynamic model, applying an observation model, and calculating error residuals of each model. In some embodiments, the day-ahead forecast can be corrected using a one-step prediction correction based on actual observed values in a current time instance.

The best model of the dynamic system can, for instance, include a model among a population of candidate models with the lowest calculated rate of error. The population of candidate models can include a number of models that can be candidates for the best model. The best model identified, at block 458, can be used for MPC.

In accordance with various embodiments of the present disclosure, the best model of a zone (e.g., sub-portion) of the dynamic system and/or best model of the dynamic system and/or population of candidate models can be used to propose a new and/or revised model. Proposing a new and/or a revised model can include optimizing the model and/or population of models. The new and/or revised model can be evaluated to identify an improved best model and/or to explore new parameters in a model of a zone of the dynamic system and/or model of the dynamic system.

In some embodiments of the present disclosure, updating the population of candidate models can include defining a new model. The new model can include a revised model of the best model and/or other candidate model of the zone of the dynamic system and/or the dynamic system.

Creating a new and/or revised can include migrating a model among the population of models and/or combining more than one model among the population. The new and/or revised model and the model prior to being migrated (e.g., best model, well performing model, and random model) can be saved, for example. In various embodiments of the present disclosure, creating a new and/or revised model can include creating a new model by crossing and/or combining a plurality of models (e.g., two, four, and ten).

Optimization, as used herein, can include optimizing the error prediction (e.g., mean absolute error) of a model. For instance, the error prediction can be optimized using a gradient based search, empirical function minimization, and/or surrogate learning.

A gradient based search can be used if the relationships in the best model is known, functions can be assumed to be smooth in θ, and/or the error function e can be assumed to be differentiable. A gradient based search can include a gradient based method (e.g., Gauss-Newton) and/or can be in combination with stochastic global optimization (e.g., memetric algorithm).

An empirical function minimization can include a gradient free method (e.g., evolutionary algorithms, generalized pattern search, and/or other gradient fee methods). In accordance with some embodiments, an empirical function minimization can be combined with a gradient based search (e.g., a memetric algorithm).

Surrogate learning, as used herein, can include employing a surrogate model. A surrogate model can consider pairs of parameters as compared to error prediction as data and fit the data by a regression model (e.g., Gaussian process).

For instance, surrogate learning can include constructing a statistical graph of the results of the population of models. A new and/or revised model can be determined using output variable values calculated for each model and observed values of the output variable. For example, a graph can include parameters and/or variables of the population of models on the x-axis and a number of rates of errors of the population of models on the y-axis based on the mean value and variance. The statistical result, for instance, can be based on a Gaussian process including mean value and variance. In accordance with various embodiments, a new and/or revised model can be created so that the improvement of the rate of error is improved by $\epsilon$.

For example, if the statistical graph results in $\epsilon=0$, there may be no exploration. A small $\epsilon$ value can result in exploring focused on sure improvements. If the statistical graph results in $\epsilon=\infty$ there may be exploration regardless of the calculated rate of error of the population models. A large $\epsilon$ value can result in exploring unknown areas, such as exploring new parameters that are not in the current population of models.

Thereby, using surrogate learning, a new model can be proposed to observe unexplored areas. The new and/or revised model can include a new best model and/or can be used to provide information, to learn, and/or to explore about the operation of a zone of the dynamic system and/or the dynamic system. The information can be used to revise a best model and/or other candidate model of a zone and/or dynamic system in the future, for example.

In some embodiments of the present disclosure, one or more optimized best model of zones of the dynamic system (e.g., new and/or revised model) can be used to propose a revised dynamic system model. For instance, a optimized best model of a zone can include a new and/or revised model of the zone with a lower and/or expected lower calculated rate of error than the best model of the zone. The revised dynamic system model can include a combination of the optimized best models of the zones of the dynamic system.

Figure 5A:
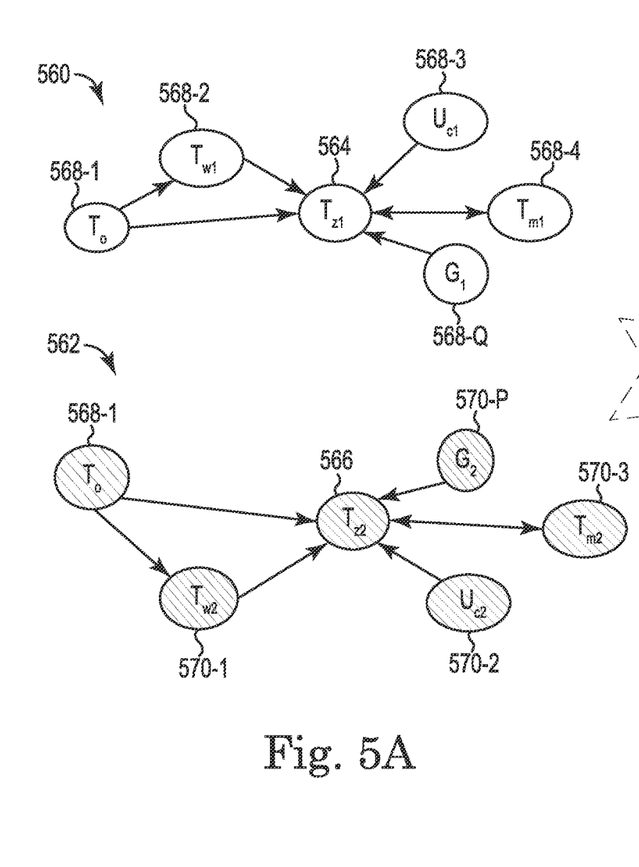
FIG. 5A illustrates an example of best models of two zones of a dynamic system in accordance with one or more embodiments of the present disclosure.

FIG. 5A illustrates an example of best models of two zones of a dynamic system in accordance with One or more embodiments of the present disclosure. The dynamic system, as illustrated in FIG. 5A, can include a dynamic system comprised of two zones. However, embodiments of the present disclosure are not so limited. Dynamic systems, in accordance with one or more embodiments of the present disclosure, can include dynamic systems comprising one zone, three zones, ten zones, and/or one hundred zones, among many other numbers of zones.

A model of a zone, such as the model of the first zone 560 and the model of the second zone 562, as illustrated in the embodiment of FIG. 5A, can be used to account for impacts of a zone. For instance, an identified model and/or best model of a zone can be used to take into account impacts on the internal air temperature of the zone (e.g., the impact and/or influence of parameters on the internal air temperature of the zone).

As used herein, an impact and/or influence can include a correlation between the value of a parameter (e.g., outside air temperature) on a value of an output variable and/or control action of the dynamic system (e.g., internal air temperature of the zone). An output variable and/or control action can, for instance, include a variable that can be set up and/or regulated by a controller. Such impacts can be zone related and/or general impacts. Examples of zone related impacts can include Remote Terminal Unit (RTU), internal gains, and wall to ambient internal mass. General impacts can include ambient temperature and time, for instance.

In accordance with some embodiments of the present disclosure, as illustrated in 5A, a dynamic system can include two zones. A model of the first zone 560 can include an output variable and/or control action 564 (e.g., internal air temperature $T_{z1}$ of the first zone) that is influenced and/or impacted by one or more parameters 568-1, 568-2, 568-3, 568-4, and 568-Q. Parameters that can influence and/or impact the internal air temperature 564 $T_{z1}$ of the first zone can include outside air temperature 568-1 $T_o$, wall temperature 568-2 $T_{w1}$, internal inputs 568-3 $U_{c1}$ (e.g., cooling, heating, and ventilation), internal mass temperature 568-4 $T_{m1}$, and internal gains 568-Q $G_1$, for example.

The model of the second zone 562, as illustrated in FIG. 5A, can include an output variable and/or control action 566 (e.g., internal air temperature $T_{z2}$ of the second zone) that is influenced and/or impacted by one or more parameters 568-1, 570-1, 570-2, 570-3, and 570-P. For example, parameters that can influence and/or impact the internal air temperature 566 $T_{z2}$ of the second zone can include outside air temperature 568-1 $T_o$, wall temperature 570-1 $T_{w2}$, internal inputs 570-2 $U_{c2}$ (e.g., cooling, heating, and ventilation), internal mass temperature 570-3 $T_{m2}$, and internal gains 570-P $G_2$.

In accordance with various embodiments of the present disclosure, one or more parameters of a zone can influence and/or impact the internal air temperature of a zone indirectly. For instance, a first parameter of a first zone can influence and/or impact a second parameter of the first zone that can then influence and/or impact the internal air temperature of the first zone. As an example, in the model of the first zone 560, the outside air temperature 568-1 $T_o$ can influence the wall temperature 568-2 $T_{w1}$, as well as directly influence the internal air temperature 564 $T_{z1}$ of the first zone. Thereby, one or more parameters of the zone can have a direct and/or indirect impact on the output variable and/or control action, and/or other parameters of the zone.

In some embodiments of the present disclosure, as illustrated by the embodiment of FIG. 5A, each zone of a dynamic system can include one or more separate parameters and/or one or more co-relating parameters. A separate parameter can include a parameter and/or value of a parameter that is unique and/or separate to a model of a zone of the dynamic system (e.g., as illustrated by the wall temperature 568-2 of the model of the first zone 560 and wall temperature 570-1 of the model of the second zone 562). A co-relating parameter can include a parameter and/or a value of a parameter of a model for more than one zone of a dynamic system (e.g., as illustrated by the outside air temperature 568-1 of FIG. 5A).

Figure 5B:
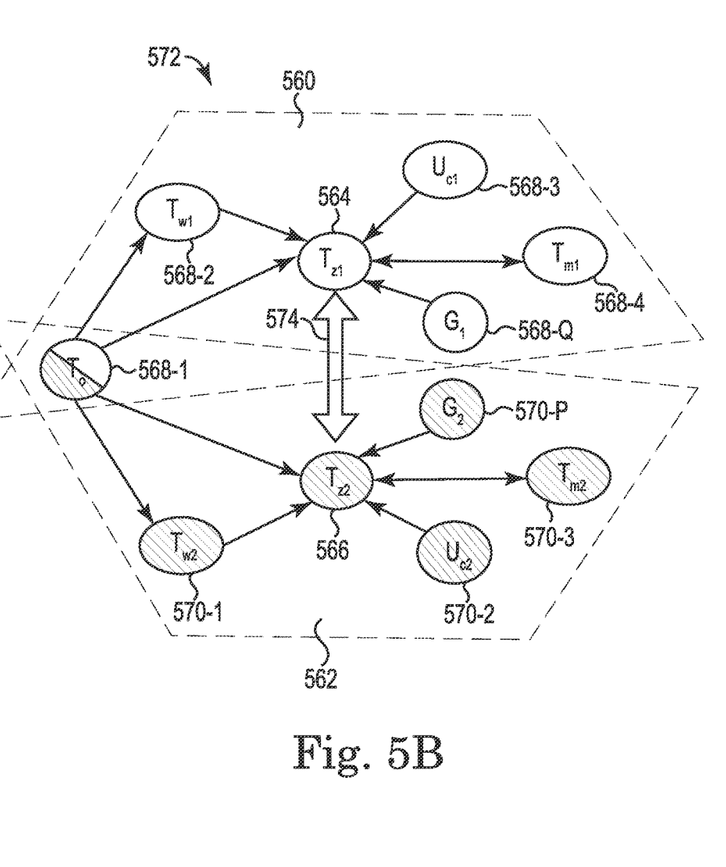
FIG. 5B illustrates an example of a model of a two-zone dynamic system in accordance with one or more embodiments of the present disclosure.

FIG. 5B illustrates an example of a model of a two-zone dynamic system in accordance with one or more embodiments of the present disclosure. The model of the two-zone dynamic system 572 can include a model of a first zone 560 and a model of a second zone 562. The model of the first zone 560 and the model of the second zone 562 of the two-zone dynamic system 572, as illustrated in FIG. 5B, can include the model of the first zone 560 and the model of the second zone 562, as illustrated in the embodiment of FIG. 5A.

The model of the two-zone dynamic system 572 can include the parameters of the identified best model of each zone (e.g., best sub-models of the dynamic system). For instance, the parameters of the model of the two-zone dynamic system 572 can include co-related parameters between models of each zone 568-1 (e.g., $T_o$), a first number of parameters 568-2, 568-3, 568-4, 568-Q of the model of the first zone 560, a second number of parameters 570-1, 570-2, 570-3, 570-P of the model of the second zone 562, and one or more interaction parameters 574.

Each of the parameters of the model of the two-zone dynamic system 572 can influence and/or impact another parameter of the model 572 and/or an output variable and/or control action 564, 566 of the model 572. For instance, the outside air temperature 568-1 can indirectly influence the internal air temperature 564 of the first zone and the internal air temperature 566 of the second zone through an internal wall temperature 568-2 of the first zone and an internal wall temperature 570-1 of the second zone, which can influence the internal air temperature 564 of the first zone and the internal air temperature 566 of the second zone. The outside air temperature 568-1 can also directly influence the internal air temperature 564 of the first zone and the internal air temperature 566 of the second zone.

In accordance with some embodiments of the present disclosure, as illustrated by FIG. 5, the internal air temperature 564 of the first zone and the internal air temperature 566 of the second zone can interact. For instance, the internal air temperature 564 of the first zone can have an influence 574 and/or impact on the internal air temperature 566 of the second zone, and/or vice versa.

Figure 6:
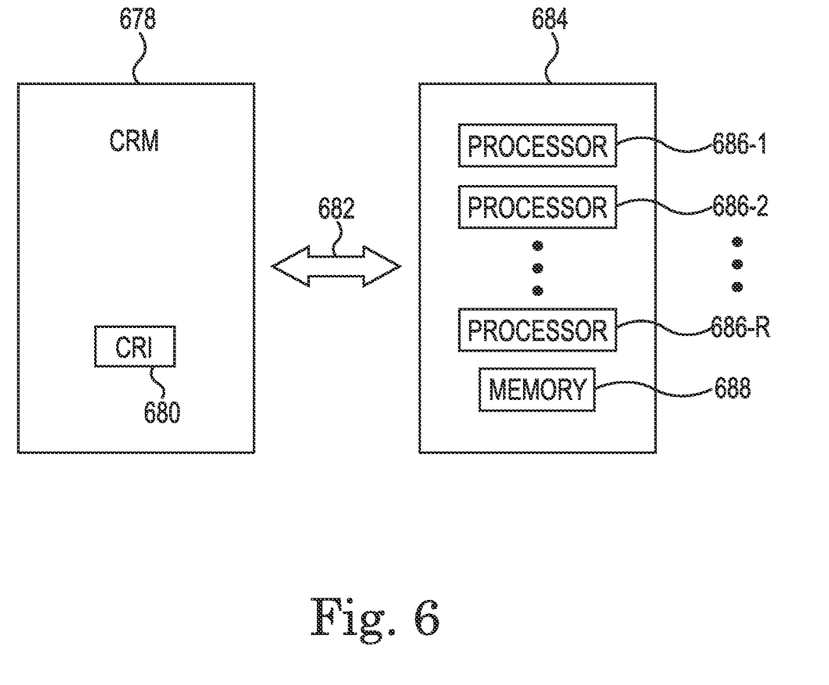
FIG. 6 illustrates a block diagram of an example of a computer-readable medium in communication with processing resources for identifying a model of a dynamic system in accordance with one or more embodiments of the present disclosure.

FIG. 6 illustrates a block diagram of an example of a computer-readable medium (CRM) 678 in communication with processing resources 686-1, 686-2 . . . 686-R for identifying a model of a dynamic system in accordance with one or more embodiments of the present disclosure.

The computing device, as described herein, can also include a CRM 678 in communication with processing resources (e.g., processors 686-1, 686-2 . . . 686-R). CRM 678 can be in communication with a device 684 (e.g., a Java® application server, among others) having processing resources 686-1, 686-2 . . . 686-R. The device 684 can be in communication with a tangible non-transitory CRM 678 storing a set of computer-readable instructions (CRI) 680 executable by one or more of the processing resources 686-1, 686-2 . . . 686-R, as described herein. The CRI 680 can also be stored in remote memory managed by a server and represent an installation package that can be downloaded, installed, and executed. The device 684 can include the memory resource 688, and the processing resources 686-1, 686-2 . . . 686-R can be coupled to the memory resource 688.

Processing resources 686-1, 686-2 . . . 686-R can execute CRI 680 that can be stored on an internal or external non-transitory CRM 678. The processing resources 686-1, 686-2 . . . 686-R can execute CRI 680 to perform various functions. For example, the processing resources 686-1, 686-2 . . . 686-R can execute CRI 680 to identify a best model for each zone of the dynamic system. A non-transitory CRM (e.g., CRM 678), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 678 can also include distributed storage media. For example, the CRM 678 can be distributed among various locations.

The non-transitory CRM 678 can be integral, or communicatively coupled, to a computing device, in a wired and/or a wireless manner. For example, the non-transitory CRM 678 can be an internal memory, a portable memory, a portable disk, or a memory associated with another computing resource (e.g., enabling CRIs to be transferred and/or executed across a network such as the Internet).

The CRM 678 can be in communication with the processing resources 686-1, 686-2 . . . 686-R via a communication path 682. The communication path 682 can be local or remote to a machine (e.g., a computer) associated with the processing resources 686-1, 686-2 . . . 686-R. Examples of a local communication path 682 can include an electronic bus internal to a machine (e.g., a computer) where the CRM 678 is one of volatile, non-volatile, fixed, and/or removable storage medium in communication with the processing resources 686-1, 686-2 . . . 686-R via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 682 can be such that the CRM 678 is remote from the processing resources e.g., 686-1, 686-2 . . . 686-R, such as in a network relationship between the CRM 678 and the processing resources (e.g., 686-1, 686-2 . . . 686-R). That is, the communication path 682 can be a network relationship. Examples of such a network relationship can include a local area network (LAN), wide area network (WAN), personal area network (PAN), and the Internet, among others. In such examples, the CRM 678 can be associated with a first computing device and the processing resources 686-1, 686-2 . . . 686-R can be associated with a second computing device (e.g., a Java® server, etc.). For example, a processing resource 686-1, 686-2 . . . 686-R can be in communication with a CRM 678, wherein the CRM 678 includes a set of instructions and wherein the processing resource 686-1, 686-2 . . . 686-R is designed to carry out the set of instructions to identify a best model for each zone of a dynamic system.

The processing resources 686-1, 686-2 . . . 686-R coupled to the memory resource 688 can identify a best model for each zone of the dynamic system. Identifying the best model for each zone can include instructions to estimate an initial value for each of a number of parameters for each model in a population of models of a zone, predict a value of an output variable for each model in the population over a period of time using the estimated initial value for each of the number of parameters, calculate an aggregate rate of error for each model in the population based on a comparison of the predicted output variable and an observed output variable over the period of time, and determine the best model for the zone based on the calculated aggregate rate of error of each model in the population.

The processing resources 686-1, 686-2 . . . 686-R coupled to the memory resource 688 can determine a number of impacts between each zone of the dynamic system, and identify a dynamic system model based on the best model of each zone and the determined number of impacts between the zones of the dynamic system. For instance, the number of impacts can be initially set to zero. Based on observations, impacts can be observed, explored, and/or discovered.

In accordance with some embodiments of the present disclosure, the processing resources 686-1, 686-2 . . . 686-R coupled to the memory resource 688 can be used to propose a revised and/or new model for a zone and/or model for the dynamic system. For instance, the revised and/or new model can be used to explore new parameters of the zone and/or dynamic system.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for identifying a model of a dynamic system, comprising:
    identifying a number of models of the dynamic system, wherein each respective one of the number of models corresponds to a different zone of the dynamic system and includes a sub-model that is a sub-zone of the dynamic system, and wherein each respective zone includes a thermostat;
    estimating a number of parameters for each of the number of models of the dynamic system, wherein the number of parameters include co-related parameters between the number of models, parameters of the model to which each respective zone corresponds, and interaction parameters;
    predicting an output variable using the estimated number of parameters for each of the number of models;
    calculating a rate of error of the predicted output variable for each of the number of models compared to an observed output variable, wherein the calculated rate of error includes an aggregate total of a number of error residuals for the output variable minimized for a desired prediction horizon and a number of one-step correction predictions;
    identifying a best model among a number of well performing models of the dynamic system based on the calculated rate of error for each of the number of models, wherein the number of well performing models includes a threshold number of models;
    combining the best model among the number of well performing models with another model among the number of well performing models to identify a revised best model, wherein the revised best model has a lower aggregate total of a number of error residuals for the output variable minimized for a desired prediction horizon and a number of one-step correction predictions than the best model;
    using the revised best model to control a controller of the dynamic system; and
    exploring new parameters using a surrogate model based on the best model, wherein the surrogate model:
        graphs the number of parameters on an x-axis of a graph and a number of rates of errors of the number of models on a y-axis of the graph;
        fits the graphed number of parameters and error rates to a regression model; and
        explores the new parameters based on a result of the fitting to the regression model.

2. The method of claim 1, wherein each of the number of models of the dynamic system includes a model of the complete dynamic system.

3. The method of claim 1, wherein predicting the output variable using the estimated parameter for each of the number of models includes predicting the output variable periodically over a period of time.

4. The method of claim 3, wherein the period of time includes twenty-four hours.

5. The method of claim 1, wherein the number of parameters for each of the number of models include a dynamic model of the zone, internal heat gains, linear correction parameters, and initial values of hidden states.

6. The method of claim 1, wherein the method includes estimating initial values for each of the number of parameters of each of the number of models.

7. The method of claim 1, wherein calculating the rate of error includes aggregating the rate of error of the output variable over a period of time for each of the number of models.

8. A non-transitory computer-readable medium storing a set of instructions executable by a processor to cause a computer to:
identify a number of models of the dynamic system, wherein each respective one of the number of models corresponds to a different zone of the dynamic system and includes a sub-model that is a sub-zone of the dynamic system, and wherein each respective zone includes a thermostat;
estimate a value for each of a number of parameters for each of the number of models of the-dynamic system over a period of time, wherein the number of parameters include co-related parameters between the number of models, parameters of the model to which each respective zone corresponds, and interaction parameters;
predict a value of an output variable of the dynamic system for each of the number of models using the estimated values of the number of parameters for each of the number of models;
calculate a rate of error for each of the number of models including comparing the predicted value of the output variable of each model to an observed value of the output variable, wherein the calculated rate of error includes an aggregate total of a number of error residuals for the output variable minimized for a desired prediction horizon and a number of one-step correction predictions;
determine a best model among a number of well performing models for each zone of the dynamic system based on the calculated rate of error for each of the models of each zone, wherein the number of well performing models includes a threshold number of models;
identify a dynamic system model based on the best model of each zone of the dynamic system;
combine the best model among the number of well performing models with another model among the number of well performing models to identify a revised best model, wherein the revised best model has a lower aggregate total of a number of error residuals for the output variable minimized for a desired prediction horizon and a number of one-step correction predictions than the best model;
identify a revised dynamic system model based on the revised best model;
use the revised best model to control a controller of the dynamic system; and
explore new parameters using a surrogate model based on the best model, wherein the surrogate model:
graphs the number of parameters on an x-axis of a graph and a number of rates of errors of the number of models on a y-axis of the graph;
fits the graphed number of parameters and error rates to a regression model; and
explores the new parameters based on a result of the fitting to the regression model.

9. The medium of claim 8, wherein identifying the dynamic system model further includes instructions executable to determine impacts between each of the zones based on observations of the dynamic system.

10. The method of claim 8, wherein the instructions are further executable to optimize the best model of zone of the dynamic system using a gradient based search.

11. The medium of claim 10, wherein the instructions are further executable to propose a revised dynamic system model using the optimized best model of the zone.

12. The medium of claim 8, wherein predicting the value of the output variable of the dynamic system for each of the number of models further includes instructions executable to predict the value of the output variable based on known inputs.

13. The medium of claim 8, wherein the instructions are further executable to use the identified dynamic system model for model predictive control.

14. The medium of claim 8, wherein the instructions are further executable to store the calculated rate of error for the models of the zones.

15. The medium of claim 14, wherein the instructions are further executable to propose a new zone model based on the stored rate of errors of the models of the zone.

16. A system for identifying a model of a dynamic system, the system comprising a processing resource in communication with a non-transitory computer-readable medium, wherein the non-transitory computer-readable medium includes a set of instructions and wherein the processing resource is designed to carry out the set of instructions to:
identify a best model for each zone of the dynamic system, wherein identifying the best model for each zone includes instructions to:
identify a number of models in a population of models for each zone, wherein each respective one of the number of models corresponds to a different zone and includes a subzone of the zone, and wherein each respective zone includes a thermostat;
estimate an initial value for each of a number of parameters for each model in the population of models for a zone, wherein the number of parameters include co-related parameters between the number of models, parameters of the model to which each respective zone corresponds, and interaction parameters;
predict a value of an output variable for each model in the population over a period of time using the estimated initial values of the number of parameters for each model;
calculate an aggregate rate of error for each model in the population based on a comparison of the predicted value of the output variable and an observed value of the output variable over the period of time, wherein the calculated rate of error includes an aggregate total of a number of error residuals for the output variable minimized for a desired prediction horizon and a number of one-step correction predictions; and
determine the best model among a number of well performing models for each zone based on the calculated aggregate rate of error of each of the number of models in the population, wherein the number of well performing models includes a threshold number of models;
determine a number of impacts between each zone of the dynamic system;
identify a dynamic system model based on the best model for each zone and the determined number of impacts between the zones of the dynamic system;
combine the best model among the number well performing models for each zone with another model among the number well performing models for that respective zone to identify a revised best model for each zone, wherein the revised best model for each zone has a lower aggregate total of a number of error residuals for the output variable minimized for a desired prediction horizon and a number of one-step correction predictions than the best model for each zone;

identify a revised dynamic system model based on the revised best model for each zone;

use the revised best model to control a controller of the dynamic system; and explore new parameters using a surrogate model based on the best model for each zone, wherein the surrogate model:

graphs the number of parameters on an x-axis of a graph and a number of rates of errors of the number of models on a y-axis of the graph;

fits the graphed number of parameters and error rates to a regression model; and explores the new parameters based on a result of the fitting to the regression model.

17. The system of claim 16, wherein the processing resource is designed to further carry out the set of instructions to save a threshold number of models for each zone in the population.

18. The system of claim 16, wherein predicting the value of the output variable for each of the number of models of the zone includes instructions to:

predict a first value of the output variable at a first time instance; and predict a second value of the output variable at a second time instance based on an observed value of the output variable at the first time instance.

* * * * *